(12) United States Patent
Brown et al.

(10) Patent No.: US 7,395,537 B1
(45) Date of Patent: Jul. 1, 2008

(54) ADMINISTERING THE WORKLOAD OF A DATABASE SYSTEM USING FEEDBACK

(75) Inventors: Douglas P. Brown, Rancho Santa Fe, CA (US); Anita Richards, San Juan Capistrano, CA (US); Bhashyam Ramesh, San Diego, CA (US); Caroline M. Ballinger, Culver City, CA (US); Richard D. Glick, Valley Center, CA (US)

(73) Assignee: Teradata, US Inc., Miamisburg, OH (US)

( * ) Notice: Subject to any disclaimer, the term of this patent is extended or adjusted under 35 U.S.C. 154(b) by 885 days.

(21) Appl. No.: 10/730,348

(22) Filed: Dec. 8, 2003

(51) Int. Cl.
G06F 9/46 (2006.01)
G06F 7/00 (2006.01)
G06F 15/16 (2006.01)

(52) U.S. Cl. .................. 718/104; 718/105; 718/106; 707/1; 707/2; 709/200; 709/201; 709/202; 709/203

(58) Field of Classification Search .......... 718/100–108; 709/220, 221, 200–203; 707/10, 1–2
See application file for complete search history.

(56) References Cited

U.S. PATENT DOCUMENTS

| | | | | |
|---|---|---|---|---|
| 5,473,773 A * | 12/1995 | Aman et al. | ................ | 718/104 |
| 5,537,542 A * | 7/1996 | Eilert et al. | ................ | 709/201 |
| 5,675,797 A * | 10/1997 | Chung et al. | ................ | 718/104 |
| 6,718,358 B1 * | 4/2004 | Bigus et al. | ................ | 718/100 |
| 6,950,848 B1 * | 9/2005 | Yousefi'zadeh | ............ | 709/203 |
| 7,146,353 B2 * | 12/2006 | Garg et al. | .................... | 707/2 |
| 7,228,546 B1 * | 6/2007 | McCarthy et al. | .......... | 718/104 |
| 2003/0002649 A1 * | 1/2003 | Hettish | ........................ | 379/231 |
| 2003/0005028 A1 * | 1/2003 | Dritschler et al. | ........... | 709/104 |
| 2003/0233391 A1 * | 12/2003 | Crawford et al. | ............ | 709/104 |
| 2004/0021678 A1 * | 2/2004 | Ullah et al. | ................. | 345/700 |

(Continued)

OTHER PUBLICATIONS

Beyer et al., "Protecting the Quality of Service of Existing Information Systems", Computer Sciences Department, University of Wisconsin, 2003, pp. 1-10.*

Nikolaou et al., "Transaction Routing for Distributed OLTP Systems: Survey and Recent Results", Department of Computer Science, University of Crete and Institute of Computer Science, 2002, pp. 1-26.*

(Continued)

*Primary Examiner*—Meng-Al T. An
*Assistant Examiner*—Jennifer N. To
(74) *Attorney, Agent, or Firm*—Howard Speight

(57) ABSTRACT

In a method, computer program and process for administering the workload of a database system as it executes one or more requests the one or more requests are sorted into one or more workload groups. Each workload group has an associated level of service desired from the database system. The one or more requests are executed in an order intended to achieve the levels of service associated with each of the workload groups. The system resources are assigned to the one or more workload groups as necessary to provide the level of service associated with each workload group. The execution of requests is monitored on a short-term basis to detect a deviation from the level of service greater than a short-term threshold. If such a deviation is detected, the assignment of system resources to workload groups is adjusted to reduce the deviation. Monitoring is also performed on a long-term basis to detect deviations from the expected level of service greater than a long-term threshold. If such a deviation is detected, the execution of requests is adjusted to better provide the expected level of service.

48 Claims, 14 Drawing Sheets

U.S. PATENT DOCUMENTS

2004/0225631 A1* 11/2004 Elnaffar et al. .................. 707/1
2004/0243692 A1* 12/2004 Arnold et al. ............... 709/220
2005/0038789 A1*  2/2005 Chidambaran et al. ........ 707/10
2005/0039183 A1*  2/2005 Romero et al. .............. 718/100
2005/0066326 A1*  3/2005 Herbeck et al. ............. 718/100
2005/0262183 A1* 11/2005 Colrain et al. .............. 709/200

OTHER PUBLICATIONS

Sinnwell et al., "Managing Distributed Memory to Meet Multiclass Workload Response Time Goals", Department of Computer Science, University of the Saarland, 2002, pp. 1-8.*
Oracle, "Orcale9l Database Resoruce Manager", Technical Whitepaper, 2001, pp. 1-11.*

* cited by examiner

ADMINISTRATOR

REGULATOR

FIG. 9

Workloads for [8AM - 10AM Reg. Weekdays ▼]

| WORKLOAD GROUP NAME | CLASSIFY & EXCEPTION CRITERIA | S. L. Goals | | S. L. Goal | | | | |
|---|---|---|---|---|---|---|---|---|
| | | DESIRED RESPONSE & SERVICE LEVEL | ENFORCEMENT PRIORITY | OPERATING WINDOW | ARRIVAL RATE | INITIATION INSTRUCTION | EXCEPTION PROCESSING |
| Inventory Tactical | Criteria | <= 1 sec @ 95% | Tactical | 8AM - 6PM | 75/sec | Expedite | [Inventory Long Qry] |
| CRM Tactical | Criteria | <= 3 sec @ 80% | Tactical | 6AM - 6PM | 25/sec | Expedite | [Crm Analytics] |
| Call Ctr Tactical | Criteria | <= 2 sec @ 90% | Tactical | 7AM - 12PM | 200/sec | Expedite | [Call Ctr Reports] |
| Sales Short Qry | Criteria | < 10 sec @ 90% | Priority | 7AM - 12PM | 500/hour | Exec | Log |
| CRM Short Qry | Criteria | < 2 min @ 75% | Normal | 9AM - 3PM | 35/hour | [Delay] | Log |
| SuperUser/Short DBA | Criteria | < 5 min @ 50% | Normal | 8AM - 10AM | 15/hour | Exec | none |
| Inventory Long Qry | Criteria | < 30 min @ 80% | Normal | all | 3/hour | Exec | Alert |
| Call Ctr Reports | Criteria | < 20 min @ 80% | Normal | all | 0.2/hour | Exec | none |
| Sales Cont Loads | Criteria | per arrival rate | Tactical | 7AM - 11AM | 5000/sec | Expedite | none |
| Inventory Batch | Criteria | none | Backgrnd | 10PM - 9AM | unknown | [Delay] | Abort |
| CRM Analytics | Criteria | none | Backgrnd | 10PM - 10AM | unknown | Exec | Abort |
| Sales Long Qry | Criteria | < 8 Hours @ 50% | Backgrnd | all | unknown | Exec | Abort |
| Development | Criteria | none | Backgrnd | 8AM - 8PM | unknown | Exec | |

FIG. 10

Operating Windows for Workload [Inventory Tactical ▼]

| WORKLOAD DIFINITION NAME | S. L. Goals | | | | | |
|---|---|---|---|---|---|---|
| | DESIRED RESPONSE & SERVICE LEVEL | ENFORCEMENT PRIORITY | OPERATING WINDOW | ARRIVAL RATE | INITIATION INSTRUCTION | EXCEPTION PROCESSING |
| [Inventory Tactical] | <= 1 sec @ 95% | 2 | 8AM - 6PM | 75/sec | Expedite | [Inventory Long Qry] |
| | | 3 | 6PM - 12AM | 20/sec | Expedite | [Inventory Long Qry] |
| | | 6 | 12AM - 8AM | 100/hour | Exec | Abort |

FIG. 12

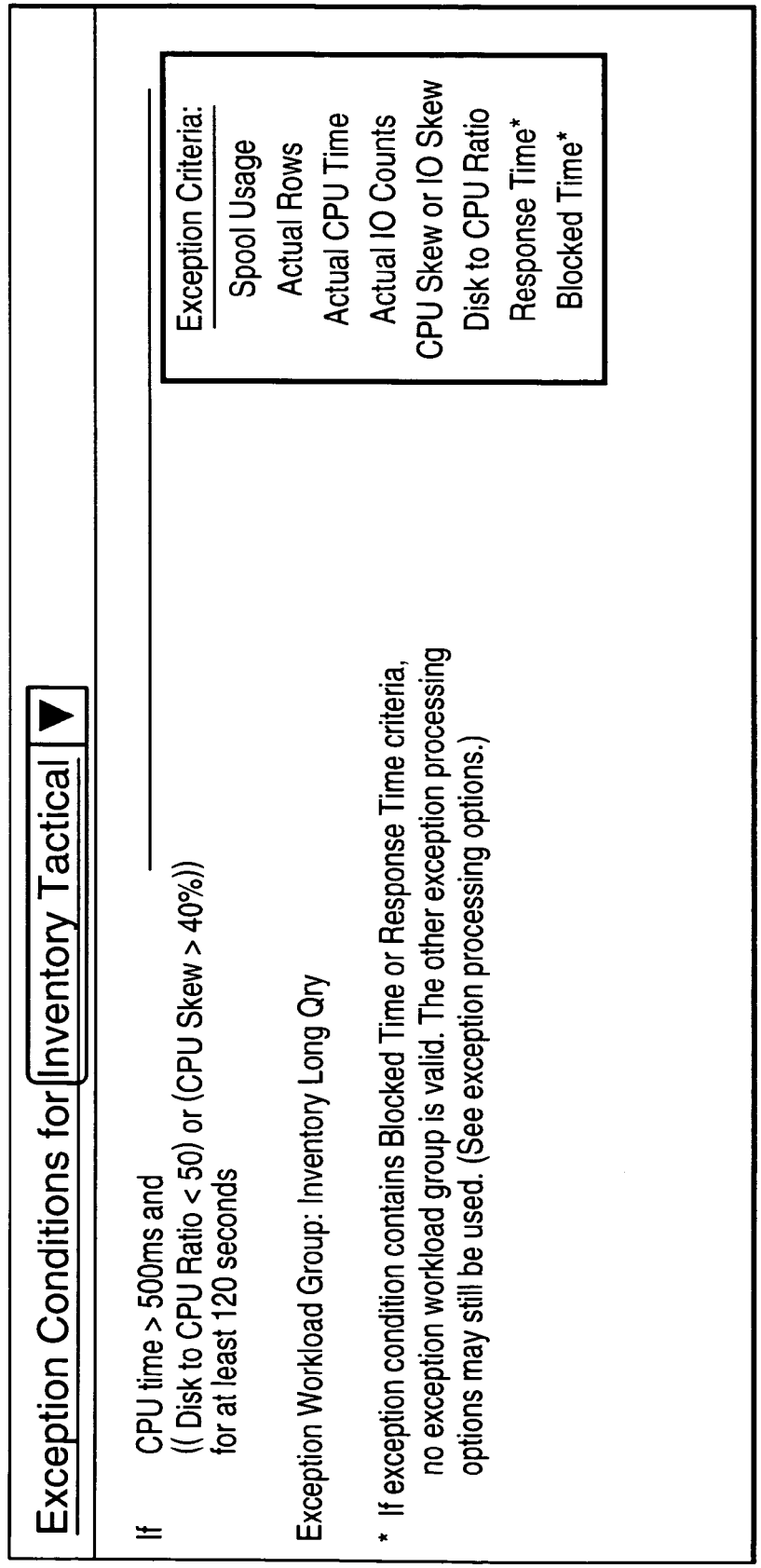

Exception Conditions for Inventory Tactical ▶

If   CPU time > 500ms and
     ((Disk to CPU Ratio < 50) or (CPU Skew > 40%))
     for at least 120 seconds Exception Workload Group: Inventory Long Qry \* If exception condition contains Blocked Time or Response Time criteria, no exception workload group is valid. The other exception processing options may still be used. (See exception processing options.)

Exception Criteria:
- Spool Usage
- Actual Rows
- Actual CPU Time
- Actual IO Counts
- CPU Skew or IO Skew
- Disk to CPU Ratio
- Response Time*
- Blocked Time*

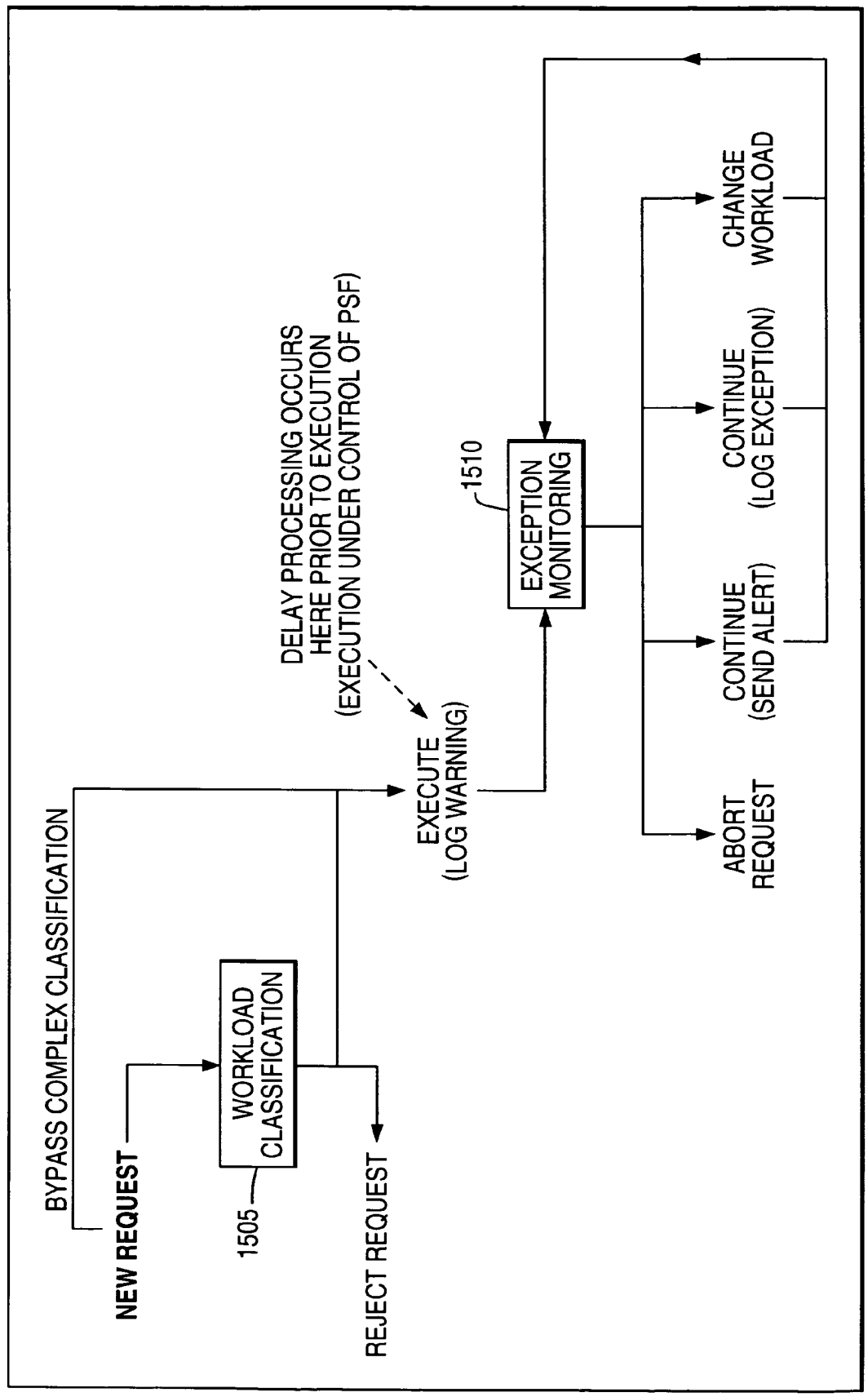

ADMINISTERING THE WORKLOAD OF A DATABASE SYSTEM USING FEEDBACK

BACKGROUND

As database management systems continue to increase in function and to expand into new application areas, the diversity of database workloads, and the problem of administering those workloads, is increasing as well. In addition to the classic relational DBMS "problem workload," consisting of short transactions running concurrently with long decision support queries and load utilities, workloads with an even wider range of resource demands and execution times are expected in the future. New complex data types (e.g., Large Objects, image, audio, video) and more complex query processing (rules, recursion, user defined types, etc.) will result in widely varying memory, processor, and disk demands on the system.

SUMMARY

In general, in one aspect, the invention features a method for administering the workload of a database system as it executes one or more requests. The method includes sorting the one or more requests into one or more workload groups. Each workload group has an associated level of service desired from the database system. The method further includes executing the one or more requests in an order intended to achieve the levels of service associated with each of the workload groups. The method further includes assigning system resources to the one or more workload groups as necessary to provide the level of service associated with each workload group. The method further includes monitoring on a short-term basis the execution of requests to detect a deviation from the level of service greater than an short-term threshold. If such a deviation is detected, the method includes adjusting the assignment of system resources to workload groups to reduce the deviation. The method further includes monitoring on a long-term basis to detect deviations from the expected level of service greater than a long-term threshold. If such a deviation is detected, adjusting the execution of requests to better provide the expected level of service.

Implementations of the invention may include one or more of the following. Assignment of system resources to applications may include adjusting the CPU and associated IO allocation assigned to each workload group. Sorting may include dividing the requests into one or more workload groups and assigning service level goals (SLGs) to the one or more workload groups. Sorting may further include mapping the one or more workload groups to the one or more classes depending on the SLGs assigned to each of the one or more workload groups. Assigning SLGs may include accepting input from a user and providing guidance to the user. Providing guidance may include receiving information regarding the performance of the system and providing guidance to the user based on the received information regarding a current ability of the system to satisfy the SLGs. Assigning SLGs may include publishing the SLGs to the system. Monitoring on a short-term basis may include monitoring the throughput of requests assigned to each workload group and calculating a performance goal index (PGI) from throughput for each workload group. Monitoring the throughput may include measuring the average response time, where an SLG includes a response time goal, and calculating the PGI may include dividing the average response time by the response time goal. Adjusting the assignment of system resources may include adjusting the assignment of the system resources to the one or more workload groups to minimize the maximum PGI. The workload groups may be divided into high priority workload groups and low priority workload groups and adjusting the assignment of system resources may include adjusting the assignment of the system resources in favor of the high priority workload groups to minimize the maximum PGI for the high priority workload groups. Adjusting the execution of requests may include swapping out a request based on its workload group assignment to free up system resources. Adjusting the execution of requests includes aborting the execution of a request based on its workload group assignment or delaying execution of a request based on its workload group assignment. Monitoring on a long-term basis may include logging the deviations greater than the long-term threshold in an error log. Monitoring on a long-term basis may further include making the error log available for a user to view.

In general, in another aspect, the invention features a computer program, stored on a tangible storage medium, for use in administering the workload of a database system as it executes one or more requests. The program including executable instructions that cause a computer to sort the one or more requests into one or more workload groups. Each workload group has an associated level of service desired from the database system. The executable instructions further cause the computer to execute the one or more requests in an order intended to achieve the levels of service associated with each of the workload groups. The executable instructions further cause the computer to assign system resources to the one or more workload groups as necessary to provide the level of service associated with each workload group. The executable instructions further cause the computer to monitor on a short-term basis the execution of requests to detect a deviation from the level of service greater than an short-term threshold. If such a deviation is detected, the executable instructions further cause the computer to adjust the assignment of system resources to workload groups to reduce the deviation. The executable instructions further cause the computer to monitor on a long-term basis to detect deviations from the expected level of service greater than a long-term threshold. If such a deviation is detected, the executable instructions further cause the computer to adjust the execution of requests to better provide the expected level of service.

In general, in another aspect, the invention features a database system including a massively parallel processing system, which includes one or more nodes, a plurality of CPUs, each of the one or more nodes providing access to one or more CPUs, a plurality of data storage facilities each of the one or more CPUs providing access to one or more data storage facilities and a process for execution on the massively parallel processing system for administering the workload of a database system as it executes one or more requests. The process includes sorting the one or more requests into one or more workload groups. Each workload group has an associated level of service desired from the database system. The process further includes executing the one or more requests in an order intended to achieve the levels of service associated with each of the workload groups. The process further includes assigning system resources to the one or more workload groups as necessary to provide the level of service associated with each workload group. The process further includes monitoring on a short-term basis the execution of requests to detect a deviation from the level of service greater than an short-term threshold. If such a deviation is detected, the process includes adjusting the assignment of system resources to workload groups to reduce the deviation. The process further includes monitoring on a long-term basis to detect deviations from the expected level of service greater than a long-term threshold. If such a deviation is detected, adjusting the execution of requests to better provide the expected level of service.

BRIEF DESCRIPTION OF THE DRAWINGS

FIGS. 9-14 are screen shots illustration the selection of service level agreement parameters.

FIG. 15 is a flow chart illustrating the flow of workload processing.

DETAILED DESCRIPTION

Figure 1:
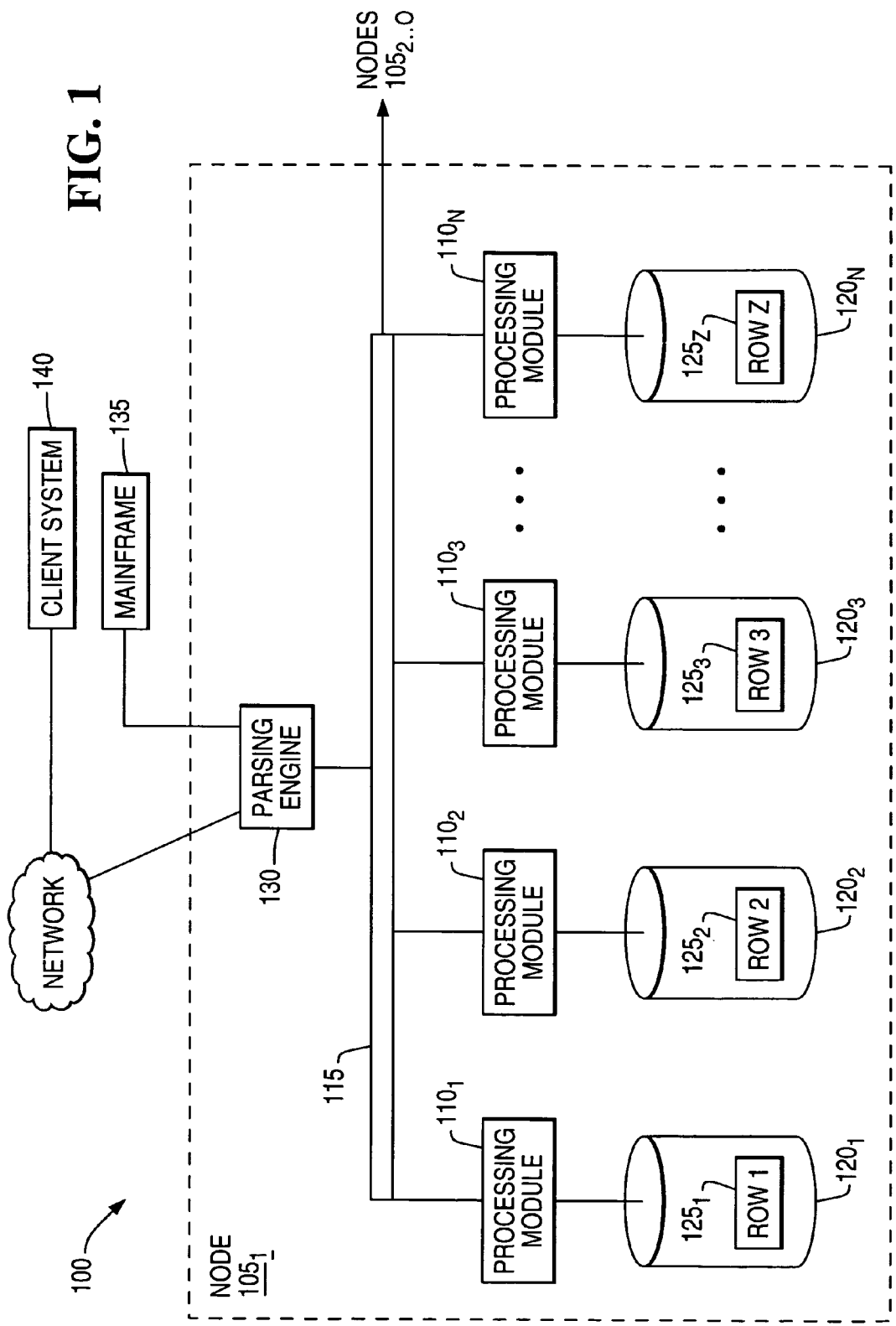
FIG. 1 is a block diagram of a node of a database system.

The technique for administering the workload of a database system using feedback disclosed herein has particular application, but is not limited, to large databases that might contain many millions or billions of records managed by a database system ("DBS") 100, such as a Teradata Active Data Warehousing System available from NCR Corporation. FIG. 1 shows a sample architecture for one node $105_1$ of the DBS 100. The DBS node $105_1$ includes one or more processing modules $110_{1...N}$, connected by a network 115, that manage the storage and retrieval of data in data-storage facilities $120_{1...N}$. Each of the processing modules $110_{1...N}$ may be one or more physical processors or each may be a virtual processor, with one or more virtual processors running on one or more physical processors.

For the case in which one or more virtual processors are running on a single physical processor, the single physical processor swaps between the set of N virtual processors.

For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $110_{1...N}$ manages a portion of a database that is stored in a corresponding one of the data-storage facilities $120_{1...N}$. Each of the data-storage facilities $120_{1...N}$ includes one or more disk drives. The DBS may include multiple nodes $105_{2...O}$ in addition to the illustrated node $105_1$, connected by extending the network 115.

The system stores data in one or more tables in the data-storage facilities $120_{1...N}$. The rows $125_{1...Z}$ of the tables are stored across multiple data-storage facilities $120_{1...N}$ to ensure that the system workload is distributed evenly across the processing modules $110_{1...N}$. A parsing engine 130 organizes the storage of data and the distribution of table rows $125_{1...Z}$ among the processing modules $110_{1...N}$. The parsing engine 130 also coordinates the retrieval of data from the data-storage facilities $120_{1...N}$ in response to queries received from a user at a mainframe 135 or a client computer 140. The DBS 100 usually receives queries and commands to build tables in a standard format, such as SQL.

In one implementation, the rows $125_{1...Z}$ are distributed across the data-storage facilities $120_{1...N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1...N}$ and associated processing modules $110_{1...N}$ by a hash bucket map. The characteristics of the columns chosen for the primary index determine how evenly the rows are distributed.

Figure 2:
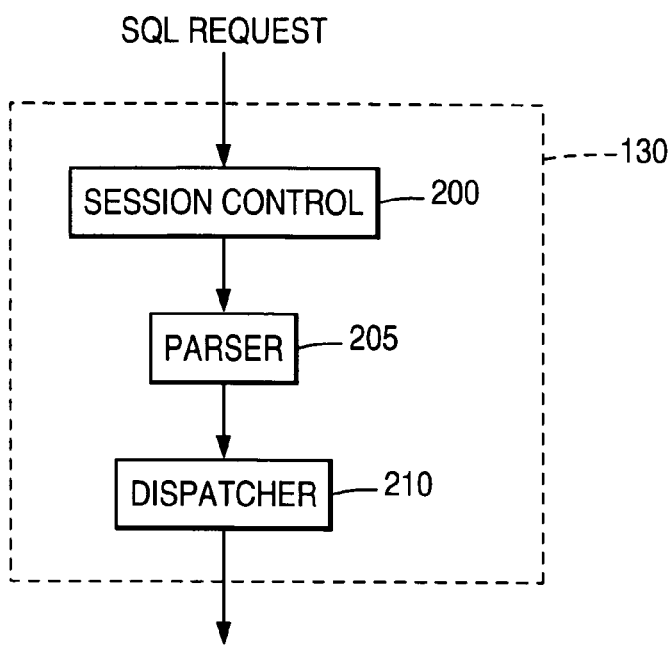
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
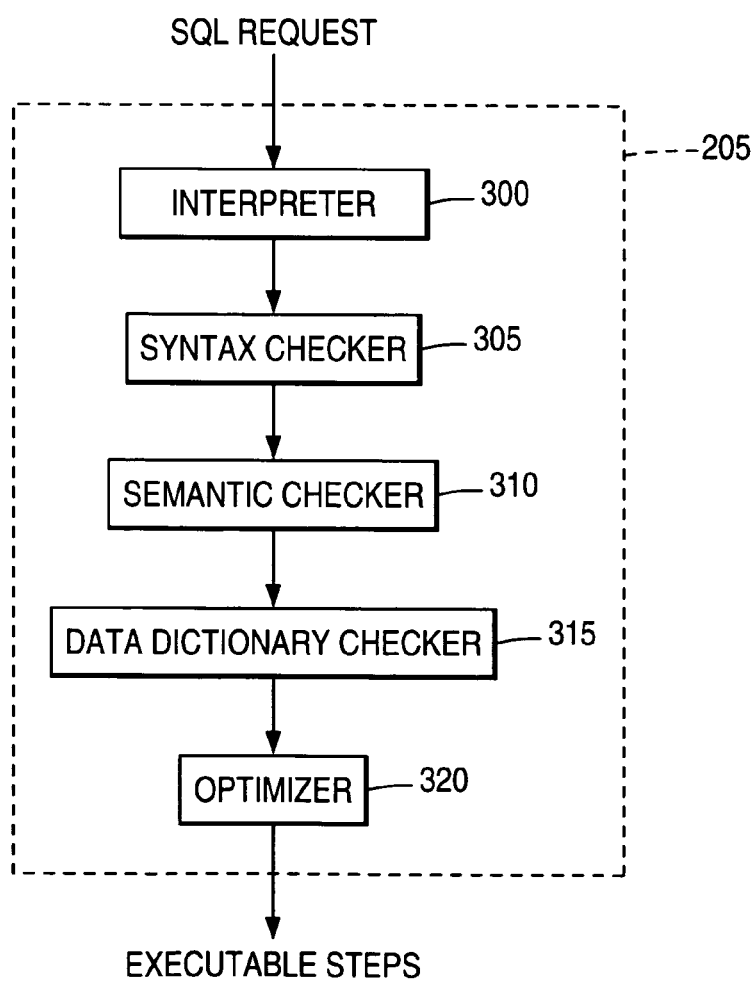
FIG. 3 is a block diagram of a parser.

Once the session control 200 allows a session to begin, a user may submit a Structured Query Language ("SQL") request, which is routed to the parser 205. As illustrated in FIG. 3, the parser 205 interprets the SQL request (block 300), checks it for proper SQL syntax (block 305), evaluates it semantically (block 310), and consults a data dictionary to ensure that all of the objects specified in the SQL request actually exist and that the user has the authority to perform the request (block 315). Finally, the parser 205 runs an optimizer (block 320), which generates the least expensive plan to perform the request.

The new set of requirements arising from diverse workloads requires a different mechanism for managing the workload on a system. Specifically, it is desired to dynamically adjust resources in order to achieve a set of per-workload response time goals for complex "multi-class" workloads. In this context, a "workload" is a set of requests, which may include queries or utilities, such as loads, that have some common characteristics, such as application, source of request, type of query, priority, response time goals, etc., and a "multi-class workload" is an environment with more than one workload. Automatically managing and adjusting database management system (DBMS) resources (tasks, queues, Central Processing Unit ("CPU"), memory, memory cache, disk, network, etc.) in order to achieve a set of per-workload response time goals for a complex multi-class workload is challenging because of the inter-dependence between workloads that results from their competition for shared resource.

The DBMS described herein accepts performance goals for each workload as inputs, and dynamically adjusts its own performance knobs, such as by allocating DBMS resources and throttling back incoming work, using the goals as a guide. In one example system, the performance knobs are called priority scheduler knobs. When the priority scheduler knobs are adjusted, weights assigned to resource partitions and allocation groups are changed. Adjusting how these weights are assigned modifies the way access to the CPU, disk and memory is allocated among requests. Given performance objectives for each workload and the fact that the workloads may interfere with each other's performance through competition for shared resources, the DBMS may find a performance knob setting that achieves one workload's goal but makes it difficult to achieve another workload's goal.

The performance goals for each workload will vary widely as well, and may or may not be related to their resource demands. For example, two workloads that execute the same application and DBMS code could have differing performance goals simply because they were submitted from different departments in an organization. Conversely, even though two workloads have similar performance objectives, they may have very different resource demands.

One solution to the problem of automatically satisfying all workload performance goals is to use more than one mechanism to manage system workload. This is because each class can have different resource consumption patterns, which means the most effective knob for controlling performance may be different for each workload. Manually managing the knobs for each workload becomes increasingly impractical as the workloads become more complex. Even if the DBMS can determine which knobs to adjust, it must still decide in which dimension and how far each one should be turned. In other words, the DBMS must translate a performance goal specification into a particular resource allocation that will achieve that goal.

The DBMS described herein achieves response times that are within a percentage of the goals for mixed workloads consisting of short transactions (tactical), long-running complex join queries, batch loads, etc. The system manages each component of its workload by goal performance objectives.

While the system attempts to achieve a "simultaneous solution" for all workloads, it attempts to find a solution for every workload independently while avoiding solutions for one workload that prohibit solutions for other workloads. Such an approach significantly simplifies the problem, finds solutions relatively quickly, and discovers a reasonable simultaneous solution in a large number of cases. In addition, the system uses a set of heuristics to control a 'closed-loop' feedback mechanism. In one example system, the heuristics are "tweakable" values integrated throughout each component of the architecture, including such heuristics as those described below with respect to FIGS. 9-14. Further, the system provides insight into workload response times in order to provide a much finer granularity of control over response times. Another example of the heuristics is the weights assigned to each of the resource partitions and allocation groups for a particular performance knob setting.

In most cases, a system-wide performance objective will not, in general, satisfy a set of workload-specific goals by simply managing a set of system resources on an individual query(ies) basis (i.e., sessions, requests). To automatically achieve a per-workload performance goal in a database or operating system environment, the system first establishes system-wide performance objectives and then manages (or regulates) the entire platform by managing queries (or other processes) in workloads.

Figure 4:
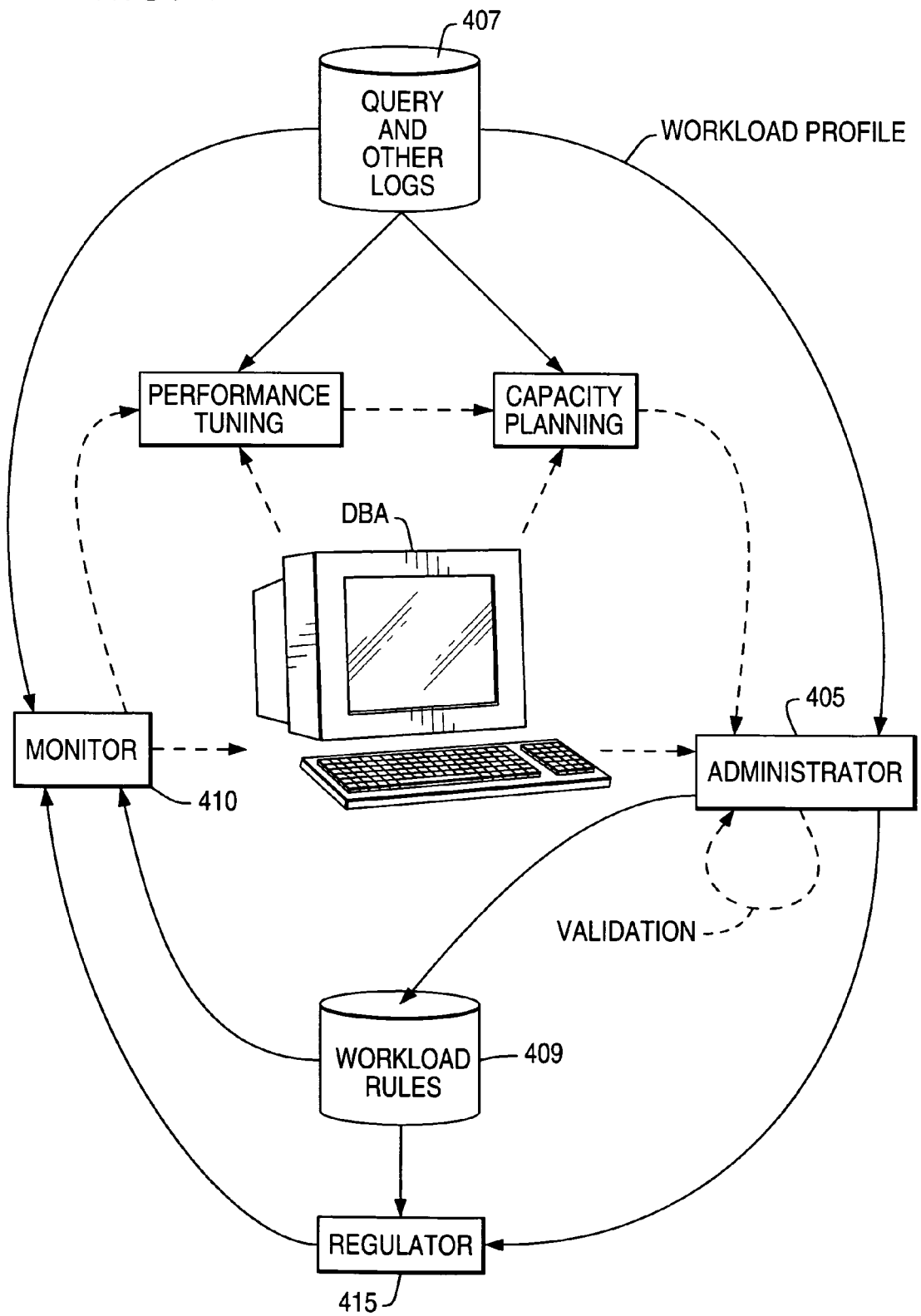
FIGS. 4-8 are block diagrams of a system for administering the workload of a database system using feedback.

The system includes a "closed-loop" workload management architecture capable of satisfying a set of workload-specific goals. In other words, the system is an automated goal-oriented workload management system capable of supporting complex workloads and capable of self-adjusting to various types of workloads. The system's operation has four major phases: 1) assigning a set of incoming request characteristics to workload groups, assigning the workload groups to priority classes, and assigning goals (called Service Level Goals or SLGs) to the workload groups; 2) monitoring the execution of the workload groups against their goals; 3) regulating (adjusting and managing) the workload flow and priorities to achieve the SLGs; and 4) correlating the results of the workload and taking action to improve performance. The performance improvement can be accomplished in several ways: 1) through performance tuning recommendations such as the creation or change in index definitions or other supplements to table data, or to recollect statistics, or other performance tuning actions, 2) through capacity planning recommendations, for example increasing system power, 3) through utilization of results to enable optimizer self-learning, and 4) through recommending adjustments to SLGs of one workload to better complement the SLGs of another workload that it might be impacting. All recommendations can either be enacted automatically, or after "consultation" with the database administrator ("DBA"). The system includes the following components (illustrated in FIG. 4):

1) Administrator (block 405): This component provides a Graphical User Interface ("GUI") to define workloads and their SLGs and other workload management requirements. The administrator 405 accesses data in logs 407 associated with the system, including a query log, and receives capacity planning and performance tuning inputs as discussed above. The administrator 405 is a primary interface for the DBA. The administrator also establishes workload rules 409, which are accessed and used by other elements of the system.

2) Monitor (block 410): This component provides a top level dashboard view, and the ability to drill down to various details of workload group performance, such as aggregate execution time, execution time by request, aggregate resource consumption, resource consumption by request, etc. Such data is stored in the query log and other logs 407 available to the monitor. The monitor also includes processes that initiate the performance improvement mechanisms listed above and processes that provide long term trend reporting, which may including providing performance improvement recommendations. Some of the monitor functionality may be performed by the regulator, which is described in the next paragraph.

3) Regulator (block 415): This component dynamically adjusts system settings and/or projects performance issues and either alerts the database administrator (DBA) or user to take action, for example, by communication through the monitor, which is capable of providing alerts, or through the exception log, providing a way for applications and their users to become aware of, and take action on, regulator actions. Alternatively, the regulator can automatically take action by deferring requests or executing requests with the appropriate priority to yield the best solution given requirements defined by the administrator (block 405).

Administration of Workload Groups (Workload Management Administrator)

The workload management administrator (block 405), or "administrator," is responsible for determining (i.e., recommending) the appropriate application settings based on SLGs. Such activities as setting weights, managing active work tasks and changes to any and all options will be automatic and taken out of the hands of the DBA. The user will be masked from all complexity involved in setting up the priority scheduler, and be freed to address the business issues around it.

Figure 5:
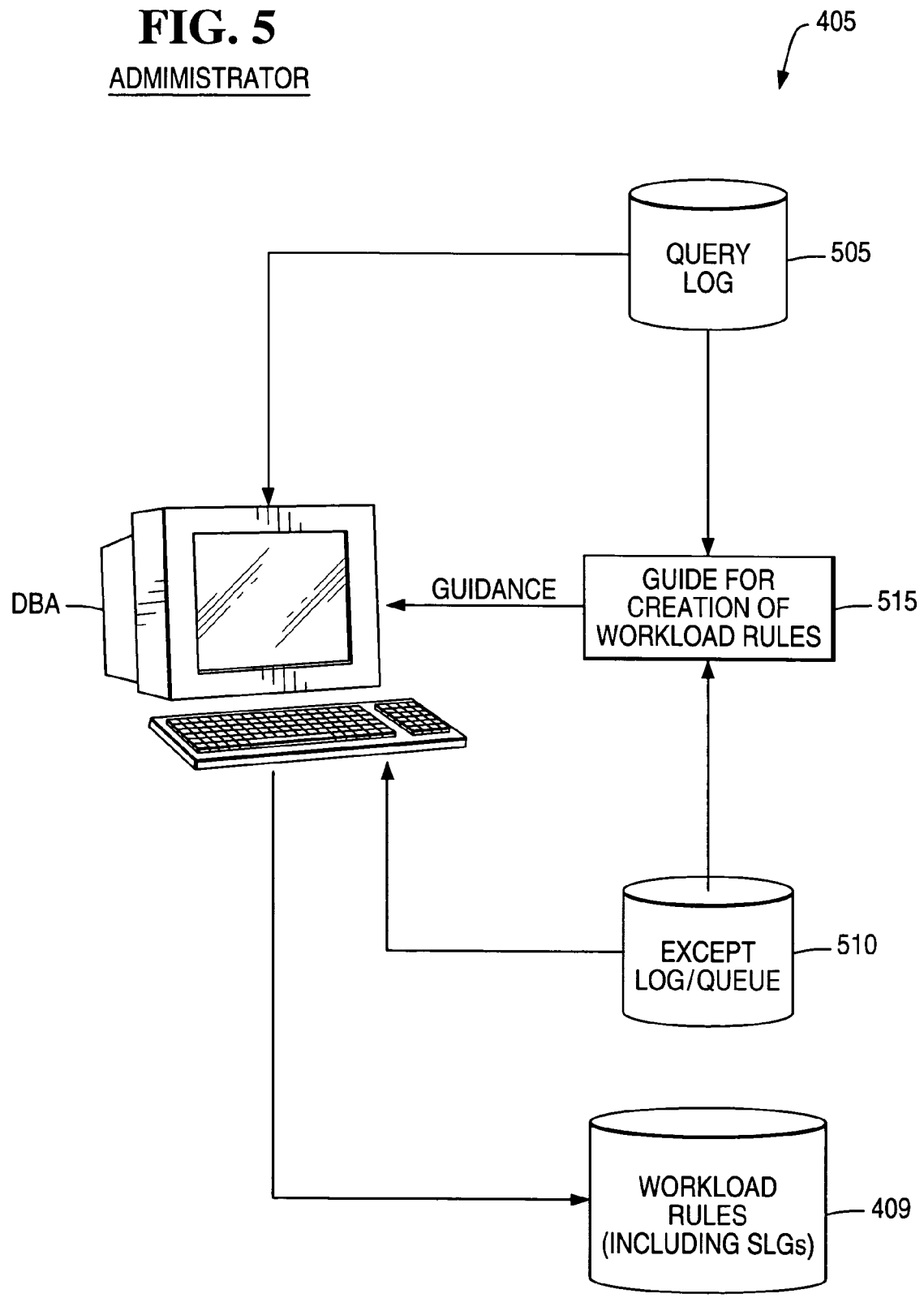

As shown in FIG. 5, the workload management administrator (block 405) allows the DBA to establish workload rules, including SLGs, which are stored in a storage facility 409, accessible to the other components of the system. The DBA has access to a query log 505, which stores the steps performed by the DBMS in executing a request along with database statistics associated with the various steps, and an exception log/queue 510, which contains records of the system's deviations from the SLGs established by the administrator. With these resources, the DBA can examine past performance and establish SLGs that are reasonable in light of the available system resources. In addition, the system provides a guide for creation of workload rules 515 which guides the DBA in establishing the workload rules 409. The guide accesses the query log 505 and the exception log/queue 510 in providing its guidance to the DBA.

The administrator assists the DBA in:

a) Establishing rules for dividing requests into candidate workload groups, and creating workload group definitions. Requests with similar characteristics (users, application, table, resource requirement, etc.) are assigned to the same workload group. The system supports the possibility of having more than one workload group with similar system response requirements.

b) Refining the workload group definitions and defining SLGs for each workload group. The system provides guidance to the DBA for response time and/or arrival rate threshold setting by summarizing response time and arrival rate history per workload group definition versus resource utilization levels, which it extracts from the query log (from data stored by the regulator, as described below), allowing the DBA to know the current response time and arrival rate patterns. The DBA can then cross-compare those patterns to satisfaction levels or business requirements, if known, to derive an appropriate response time and arrival rate threshold setting, i.e., an appropriate SLG. After the administrator specifies the SLGs, the system automatically generates the appropriate resource allocation settings, as described below. These SLG requirements are distributed to the rest of the system as workload rules.

c) Optionally, establishing priority classes and assigning workload groups to the classes. Workload groups with similar performance requirements are assigned to the same class.

d) Providing proactive feedback (ie: Validation) to the DBA regarding the workload groups and their SLG assignments prior to execution to better assure that the current assignments can be met, i.e., that the SLG assignments as defined and potentially modified by the DBA represent realistic goals. The DBA has the option to refine workload group definitions and SLG assignments as a result of that feedback.

Internal Monitoring and Regulation of Workload Groups (Regulator)

Figure 6:
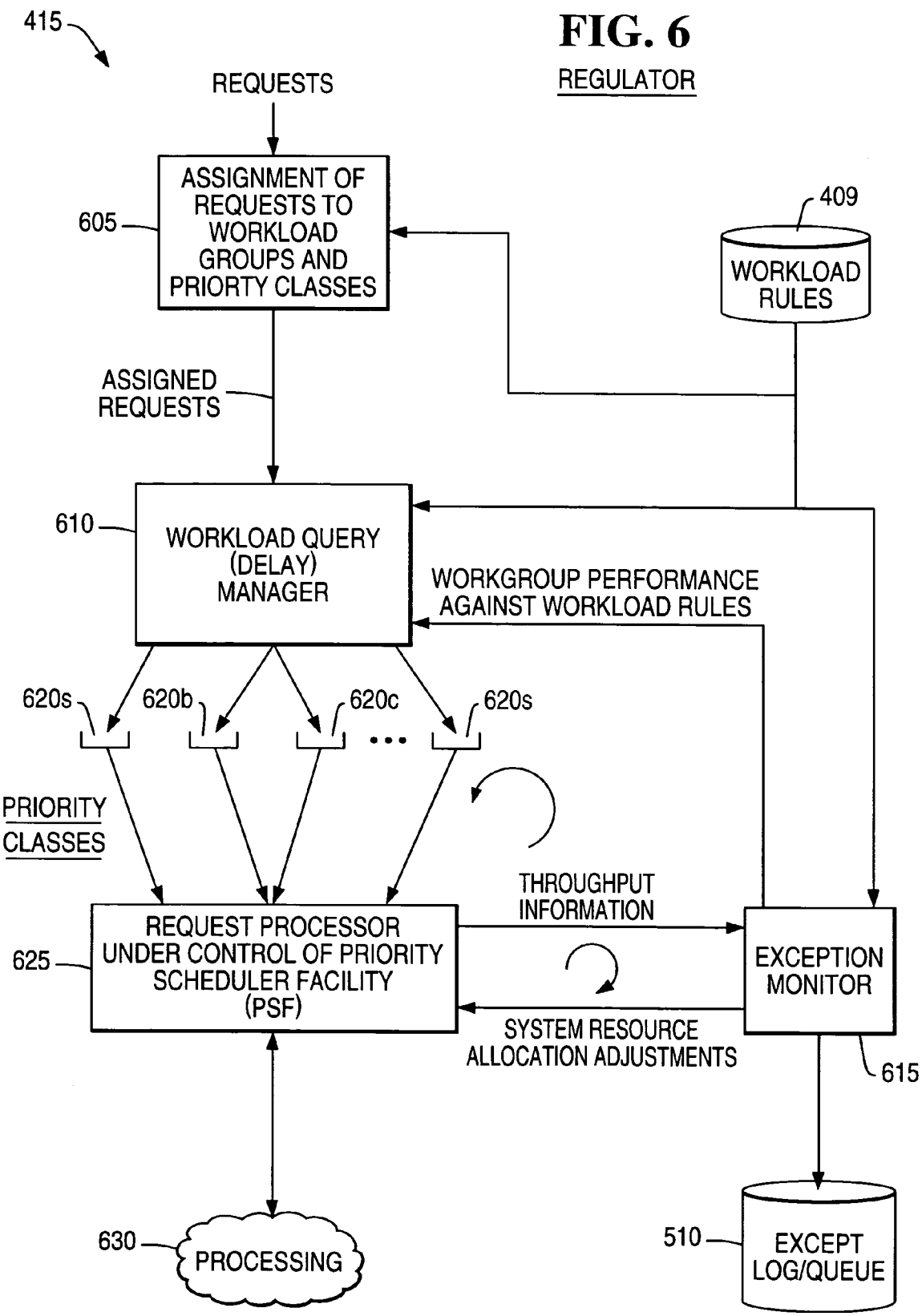

The internal monitoring and regulating component (regulator 415), illustrated in more detail in FIG. 6, accomplishes its objective by dynamically monitoring the workload characteristics (defined by the administrator) using workload rules or other heuristics based on past and current performance of the system that guide two feedback mechanisms. It does this before the request begins execution and at periodic intervals during query execution. Prior to query execution, an incoming request is examined to determine in which workload group it belongs, based on criteria described below with respect to FIG. 11. Concurrency levels, i.e., the numbers of concurrent executing queries from each workload group, are monitored, and if current workload group concurrency levels are above an administrator-defined threshold, a request in that workload group waits in a queue prior to execution until the concurrency level subsides below the defined threshold. Query execution requests currently being executed are monitored to determine if they still meet the criteria of belonging in a particular workload group by comparing request execution characteristics to a set of exception conditions. If the result suggests that a request violates the rules associated with a workload group, an action is taken to move the request to another workload group or to abort it, and/or alert on or log the situation with potential follow-up actions as a result of detecting the situation. Current response times and throughput of each workload group are also monitored dynamically to determine if they are meeting SLGs. A resource weight allocation for each performance group can be automatically adjusted to better enable meeting SLGs using another set of heuristics described with respect to FIG. 6.

As shown in FIG. 6, the regulator 415 receives one or more requests, each of which is assigned by an assignment process (block 605) to a workload group and, optionally, a priority class, in accordance with the workload rules 409. The assigned requests are passed to a workload query (delay) manager 610, which is described in more detail with respect to FIG. 7. In general, the workload query (delay) manager monitors the workload performance compared to the workload rules and either allows the request to be executed immediately or holds it for later execution, as described below. If the request is to be executed immediately, the workload query (delay) manager 610 places the request in the priority class bucket 620$a$ ... $s$ corresponding to the priority class to which the request was assigned by the administrator 405. A request processor under control of a priority scheduler facility (PSF) 625 selects queries from the priority class buckets 620$a$ ... $s$, in an order determined by the priority associated with each of the buckets, and executes it, as represented by the processing block 630 on FIG. 6.

The request processor 625 also monitors the request processing and reports throughput information, for example, for each request and for each workgroup, to an exception monitoring process 615. The exception monitoring process 615 compares the throughput with the workload rules 409 and stores any exceptions (e.g., throughput deviations from the workload rules) in the exception log/queue. In addition, the exception monitoring process 615 provides system resource allocation adjustments to the request processor 625, which adjusts system resource allocation accordingly, e.g., by adjusting the priority scheduler weights. Further, the exception monitoring process 615 provides data regarding the workgroup performance against workload rules to the workload query (delay) manager 610, which uses the data to determine whether to delay incoming requests, depending on the workload group to which the request is assigned.

As can be seen in FIG. 6, the system provides two feedback loops, indicated by the circular arrows shown in the drawing. The first feedback loop includes the request processor 625 and the exception monitoring process 615. In this first feedback loop, the system monitors on a short-term basis the execution of requests to detect deviations greater than a short-term threshold from the defined service level for the workload group to which the requests were defined. If such deviations are detected, the DBMS is adjusted, e.g., by adjusting the assignment of system resources to workload groups. The second feedback loop includes the workload query (delay) manager 610, the request processor 625 and the exception monitoring process 615. In this second feedback loop, the system monitors on a long-term basis to detect deviations from the expected level of service greater than a long-term threshold. If it does, the system adjusts the execution of requests, e.g., by delaying, swapping out or aborting requests, to better provide the expected level of service. Note that swapping out requests is one form of memory control in the sense that before a request is swapped out it consumes memory and after it is swapped out it does not. While this is the preferable form of memory control, other forms, in which the amount of memory dedicated to an executing request can be adjusted as part of the feedback loop, are also possible.

Figure 7:
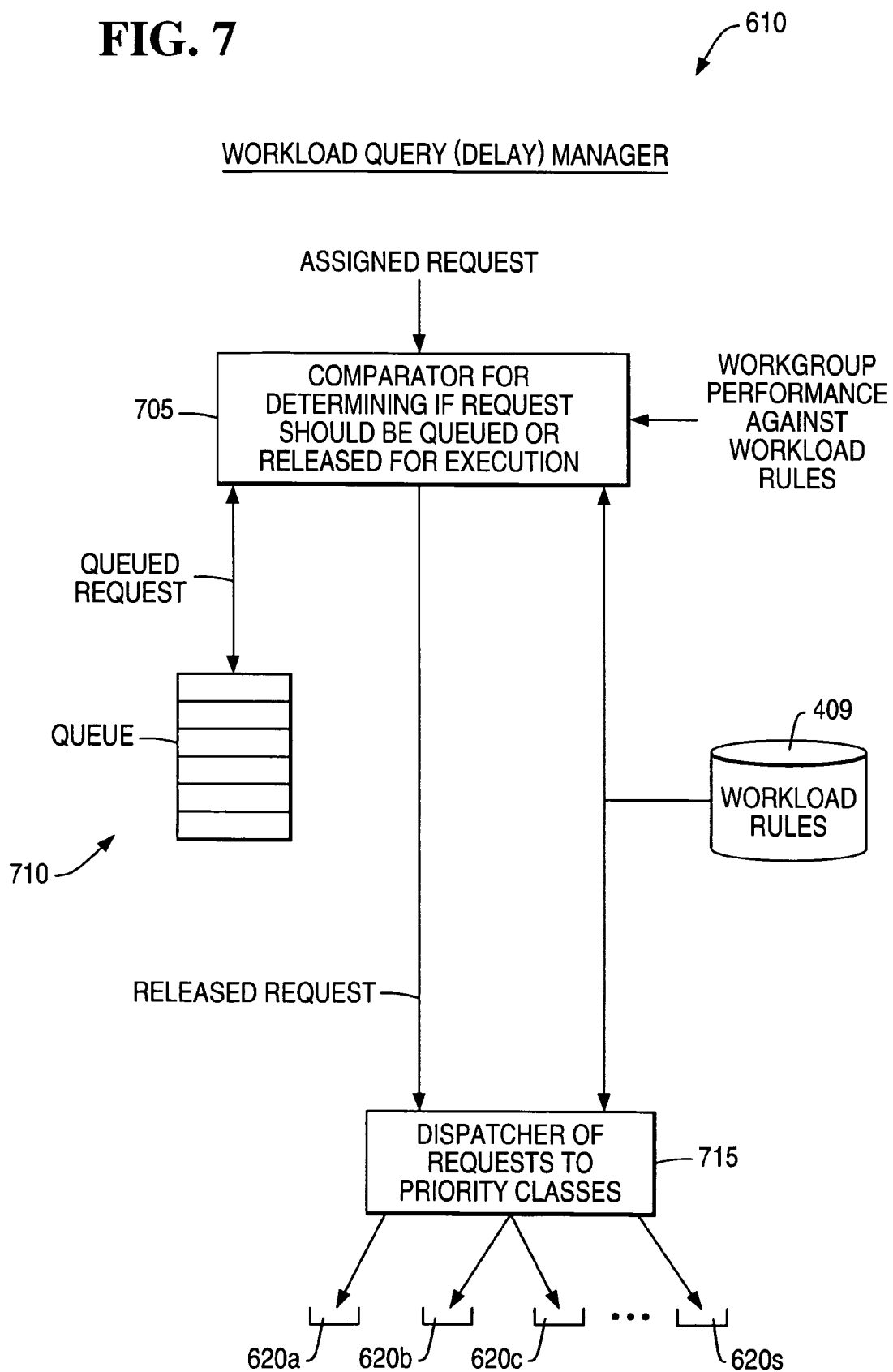

The workload query (delay) manager 610, shown in greater detail in FIG. 7, receives an assigned request as an input. A comparator 705 determines if the request should be queued or released for execution. It does this by determining the workload group assignment for the request and comparing that workload group's performance against the workload rules, provided by the exception monitoring process 615. For example, the comparator 705 may examine the concurrency level of requests being executed under the workload group to which the request is assigned. Further, the comparator may compare the workload group's performance against other workload rules.

If the comparator 705 determines that the request should not be executed, it places the request in a queue 710 along with any other requests for which execution has been delayed. The comparator 705 continues to monitor the workgroup's performance against the workload rules and when it reaches an acceptable level, it extracts the request from the queue 710 and releases the request for execution. In some cases, it is not necessary for the request to be stored in the queue to wait for workgroup performance to reach a particular level, in which case it is released immediately for execution.

Once a request is released for execution it is dispatched (block 715) to priority class buckets 620a . . . s, where it will await retrieval by the request processor 625.

Figure 8:
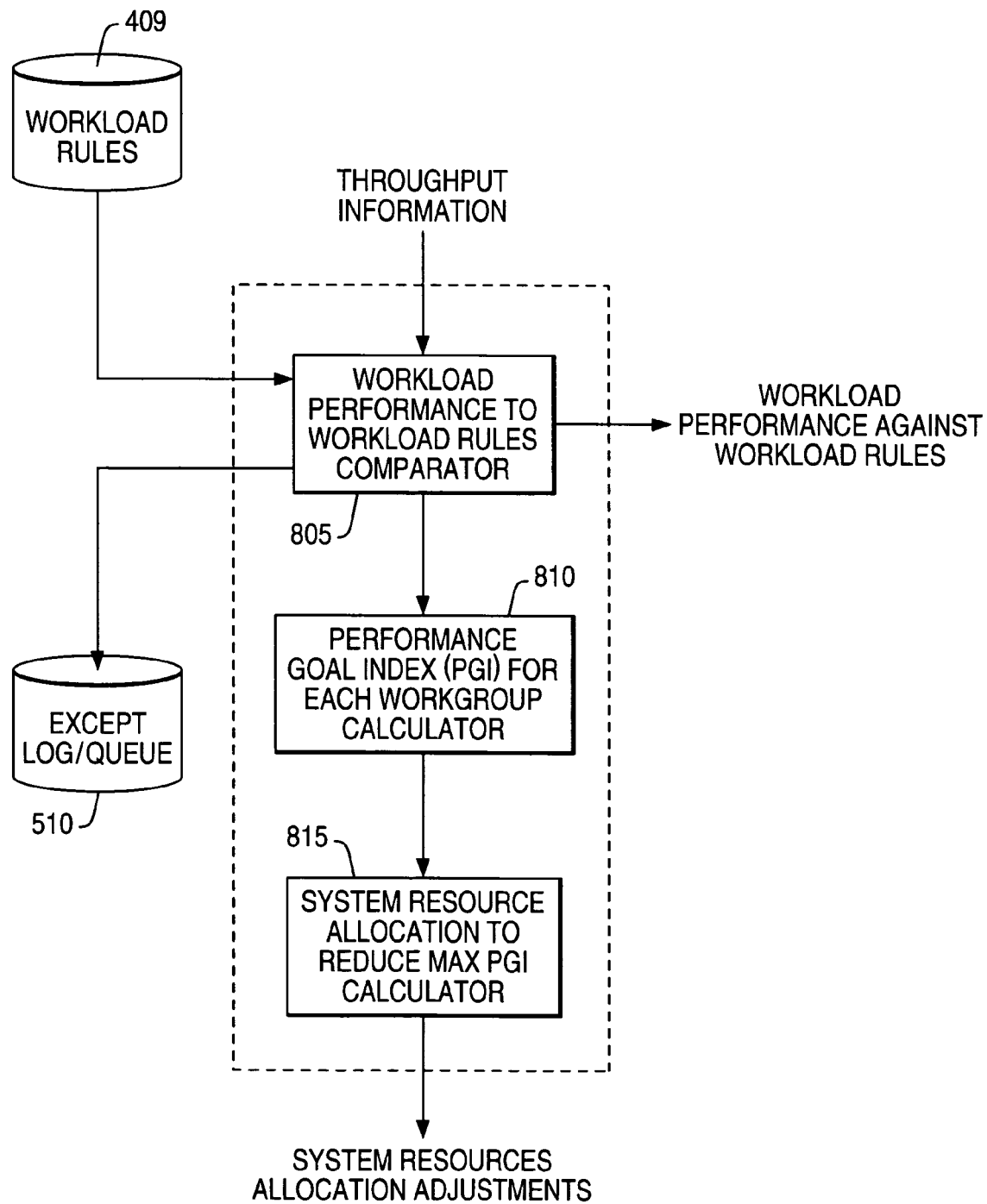

The exception monitoring process 615, illustrated in greater detail in FIG. 8, receives throughput information from the request processor 625. A workload performance to workload rules comparator 805 compares the received throughput information to the workload rules and logs any deviations that it finds in the exception log/queue 510. It also generates the workload performance against workload rules information that is provided to the workload query (delay) manager 610.

To determine what adjustments to the system resources are necessary, the exception monitoring process calculates a 'performance goal index' (PGI) for each workload group (block 810), where PGI is defined as the observed average response time (derived from the throughput information) divided by the response time goal (derived from the workload rules). Because it is normalized relative to the goal, the PGI is a useful indicator of performance that allows comparisons across workload groups.

The exception monitoring process adjusts the allocation of system resources among the workload groups (block 815) using one of two alternative methods. Method 1 is to minimize the maximum PGI for all workload groups for which defined goals exist. Method 2 is to minimize the maximum PGI for the highest priority workload groups first, potentially at the expense of the lower priority workload groups, before minimizing the maximum PGI for the lower priority workload groups. Method 1 or 2 are specified by the DBA in advance through the administrator.

The system resource allocation adjustment is transmitted to the request processor 625 (discussed above). By seeking to minimize the maximum PGI for all workload groups, the system treats the overall workload of the system rather than simply attempting to improve performance for a single workload. In most cases, the system will reject a solution that reduces the PGI for one workload group while rendering the PGI for another workload group unacceptable.

This approach means that the system does not have to maintain specific response times very accurately. Rather, it only needs to determine the correct relative or average response times when comparing between different workload groups.

In summary the regulator:
a) Regulates (adjusts) system resources against workload expectations (SLGs) and projects when response times will exceed those SLG performance thresholds so that action can be taken to prevent the problem.
b) Uses cost thresholds, which include CPU time, Input/Output ("IO") count, disk to CPU ratio (calculated from the previous two items), CPU or IO skew (cost as compared to highest node usage vs. average node usage), spool usage, response time and blocked time, to "adjust" or regulate against response time requirements by workload SLGs. The last two items in the list are impacted by system conditions, while the other items are all query-specific costs. The regulator will use the PSF to handle dynamic adjustments to the allocation of resources to meet SLGs.
c) Defers the query(ies) so as to avoid missing service level goals on a currently executing workload. Optionally, the user is allowed to execute the query(ies) and have all workloads miss SLGs by a proportional percentage based on shortage of resources (i.e., based on administrators input), as discussed above with respect to the two methods for adjusting the allocation of system resources.

Monitoring System Performance (Monitor)

The monitor 410 (FIG. 4) provides a hierarchical view of workload groups as they relate to SLGs. It provides filtering options on those views such as to view only active sessions versus all sessions, to view only sessions of certain workload groups, etc.

The monitor:
a) Provides monitoring views by workload group(s). For example, the monitor displays the status of workload groups versus milestones, etc.
b) Provides feedback and diagnostics if expected performance is not delivered. When expected consistent response time is not achieved, explanatory information is provided to the administrator along with direction as to what the administrator can do to return to consistency.
d) Identifies out of variance conditions. Using historical logs as compared to current/real-time query response times, CPU usage, etc., the monitor identifies queries that are out of variance for, e.g., a given user/account/application IDs. The monitor provides an option for automatic screen refresh at DBA-defined intervals (say, every minute.)
e) Provides the ability to watch the progress of a session/query while it is executing.
f) Provides analysis to identify workloads with the heaviest usage. Identifies the heaviest hitting workload groups or users either by querying the Query Log or other logs. With the heaviest usage identified, developers and DBAs can prioritize their tuning efforts appropriately.
g) Cross-compares workload response time histories (via Query Log) with workload SLGs to determine if query gating through altered Teradata Dynamic Workload Manager ("TDWM") settings presents feasible opportunities for the workload.

The graphical user interface for the creation of Workload Definitions and their SLGs, shown in FIG. 9, includes a Workload Group Name column, which can be filled in by the DBA. Each row of the display shown in FIG. 9 corresponds to a different workload group. The example screen in FIG. 9 shows the "Inventory Tactical" workload group, the "CRM Tactical" workload group and others. For each workload group, the DBA can assign a set of service level goals. In the example shown in FIG. 9, the service level goals include the "desired response & service level" and "enforcement policy." The desired response & service level for the Inventory Tactical workload group is "<=1 sec @95%", which means that the DBA has specified that the Inventory Tactical workload group goal is to execute within 1 second 95 percent of the time. The enforcement priority for the Inventory Tactical workload group is "Tactical", which gives this workload group the highest priority in achieving its desired response & service level goals. A lower priority, "Priority", is assigned to the Sales Short Qry workload group. As can be seen in FIG. 9, multiple workload groups can be assigned the same enforcement priority assignments. That is, the Sales Cont Loads, Inventory Tactical, CRM Tactical and Call Ctr Tactical workload groups all have "Tactical" as their enforcement priority.

Each workload group also has an "operating window," which refers to the period of time during which the service level goals displayed for that workload group are enforced. For example, the Inventory Tactical operating group has the service level goals displayed on FIG. 9 from 8 AM-6 PM. The service level goals can be changed from one operating window to another, as indicated below in the discussion of FIG. 10.

Each workload group is also assigned an arrival rate, which indicates the anticipated arrival rate of this workload. This is used for computing initial assignment of resource allocation weights, which can be altered dynamically as arrival rate patterns vary over time.

Each workload group is also assigned an "initiation instruction," which indicates how processes from this workload group are to be executed. An initiation instruction can be (a) "Expedite," which means that requests from this workload group can utilize reserved resources, known as Reserved Amp Worker Tasks, rather than waiting in queue for regular Amp Worker Tasks to become available, (b) "Exec," which means the request is executed normally, ie: without expedite privileges, or (c) "Delay," which means the request must abide by concurrency threshold controls, limiting the number of concurrent executing queries from this workload group to some specified amount. Initiation instructions are discussed in more detail with respect to FIG. 13.

Each workload group is also assigned an "exception processing" parameter, which defines the process that is to be executed if an exception occurs with respect to that workload group. For example, the exception processing for the Inventory Tactical workload group is to change the workload group of the executing query to Inventory LongQry, adopting all the characteristics of that workload group. Exception processing is discussed in more detail with respect to FIGS. 14-15.

Some of these parameters (ie: enforcement priority, arrival rate, initiation instructions, and exception processing) can be given different values over different operating windows of time during the day, as shown in FIG. 10. In the example shown in FIG. 10, three operating windows are defined: (a) 8 AM-6 PM (which corresponds to the operating window depicted in FIG. 9); (b) 6 PM-12 AM; and (c) 12 AM-8 AM.

Each of the highlighted zones in shown in FIG. 9 or 10 (i.e., the workload definition name, the initiation instructions and the exception processing definition) indicate buttons on the screen that can be activated to allow further definition of that parameter. For example, pressing the "Inv Tactical" button on FIG. 10 causes the screen shown in FIG. 11, which is the classification criteria for the Inventory Tactical workgroup, to be displayed. Through this screen, the DBA can define the request sources (who), the tables/views/databases that can be accessed (where) and/or the request resource usage predictions that can execute processes in the Inventory Tactical workgroup. The keywords shown in the highlighted boxes of FIG. 11 (who classification: User ID, Account ID, Profile, Appl Executable ID, Query Band ID, Client User ID, Client Source or Address; what classification: Estimated Time, Estimated Rows, AMPs involved, Join Type, Scan Type; where classification: Table Accessed, Database Accessed, View Accessed) can be used to formulate the query classification. In the example shown in FIG. 11, the "who" portion of the classification definition is:

All Users with Account "TacticalQrys"
and User not in (andy,john,jane)
and querybandID="These are really tactical"

Figure 11:
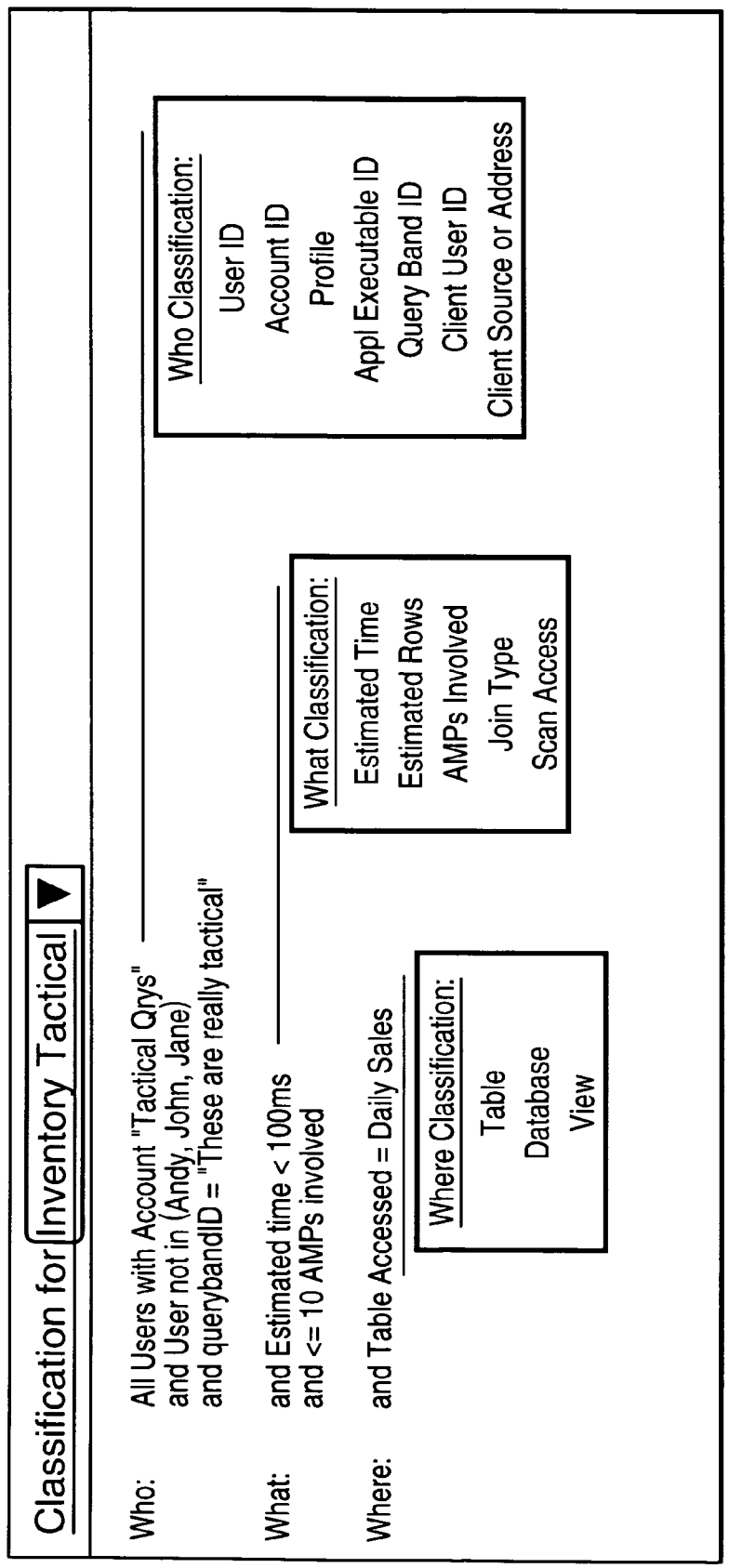

In the example shown in FIG. 11, the "what" portion of the classification has been defined as:

Estimated time <100 ms AND
<=10 AMPs involved

Note that the "estimated time" line of the "what" portion of the classification could be rephrased in seconds as "Estimated time <0.1 seconds AND".

In the example shown in FIG. 11, the "where" portion of the classification has been defined as:

Table Accessed=DailySales

Figure 13:
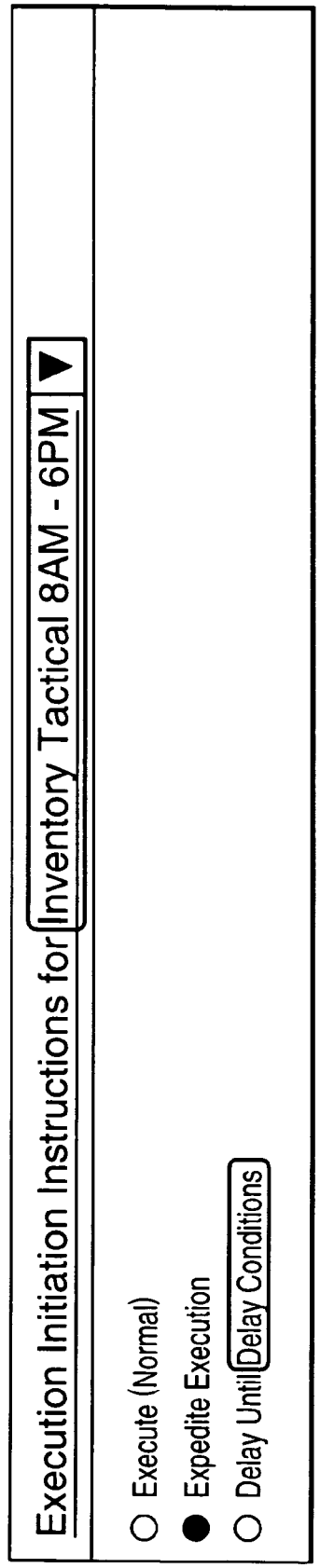

If one of the buttons shown under the exception processing column in FIGS. 9 and 10 is pressed, the screen shown in FIG. 12 appears, allowing specification of the exception conditions and processing for the selected workload group. The keywords shown in the highlighted box in the Exception Thresholds zone of the screen shown in FIG. 11 (Spool Usage, Actual Rows, Actual CPU Time, Actual IO Counts, CPU or IO Skew, Disk to CPU Ratio, Response Time and Blocked Time) can be used to formulate the Exceptions Thresholds criteria. If an exception occurs, and if the DBA desires the system to potentially continue the request under a different workload group, that workload group is defined here. In a sense, an exception indicates that the request is displaying query characteristics that are not in keeping with the norm for this workload group, so it must instead belong in the alternative workload group designated on the screen shown in FIG. 12. There are two exception conditions where this assessment could be in error: Response Time and Blocked Time. Both Response Time and Blocked Time can cause request performance to vary because of system conditions rather than the characteristics of the query itself. If these exception criteria are defined, in one example the system does not allow an alternative workload group to be defined. In one example system, some conditions need to be present for some duration before the system takes action on them. For example, a momentary skew or high disk to CPU ratio is not necessarily a problem, but if it continues for some longer period of time, it would qualify as a problem that requires exception processing. In the example shown in FIG. 12, the Exceptions Thresholds have been defined as:

CPU Time (i.e., CPU usage)>500 ms and
(Disk to CPU Ratio>50) or (CPU Skew >40%)) for at least 120 seconds Clicking on one of the buttons under the "initiation instruction" column in the display shown in FIGS. 9 and 10 causes the execution initiation instructions screen, shown in FIG. 13, to be displayed. For example, through the display shown in FIG. 13, the Execution Initiation Instructions for the Inventory Tactical workgroup for the operating window from 8 AM-6 PM can be displayed and modified. In the example shown in FIG. 13, the three options for Execution Initiation Instruction are "Execute (normal)," "Expedite Execution," and "Delay Until", with the last selection having another button, which, when pressed, allows the DBA to specify the delay conditions. In the example shown in FIG. 13, the Expedite Execution execution instruction has been selected, as indicated by the filled-in bullet next to that selection.

Figure 14:
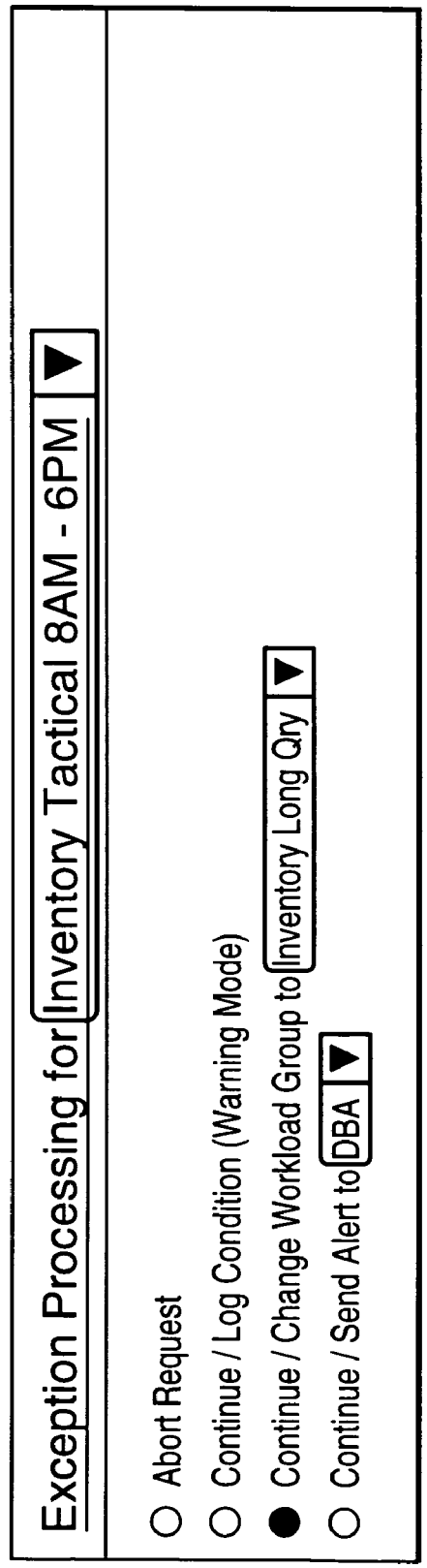

Returning to FIG. 10, the details of the Exception Processing parameter can be specified by selecting one of the highlighted buttons under the Exception Processing heading. For example, if the button for the 8 AM-6 PM operating window is pressed, the screen shown in FIG. 14 is displayed. The screen shown in FIG. 14 provides the following exception processing selections: (a) "Abort Request"; (b) "Continue/log condition (Warning Mode)"; and (c) "Continue/Change Workload Group to" the workload group allowed when the exception criteria were described in the screen shown in FIG. 12; and (d) "Continue/Send Alert to [pulldown menu for possible recipients for alerts]." If selection (a) is chosen, the associated request is aborted if an exception occurs. If selection (b) is chosen, an exception is logged in the exception log/queue 510 if one occurs. If selection (c) is chosen, and it is in the example shown in FIG. 14, as indicated by the darkened bullet, the request is automatically continued, but in the different work group pre-designated in FIG. 12. If selection (d) is chosen, processing of the request continues and an alert is sent to a destination chosen using the pulldown menu shown. In the example shown in FIG. 14, the chosen destination is the DBA.

The flow of request processing is illustrated in FIG. 15. A new request is classified by the workload classification block 1505 in which it is either rejected, and not executed, or accepted, and executed. As shown in FIG. 15, the execution delay set up using the screen illustrated in FIG. 13 occurs prior to execution under the control of PSF. The execution is monitored (block 1510) and based on the exception processing selected through the screen illustrated in FIG. 14, the request is aborted, continued with an alert being sent, continued with the exception being logged, or continued with the request being changed to a different workload, with perhaps different service level goals.

The text above described one or more specific embodiments of a broader invention. The invention also is carried out in a variety of alternative embodiments and thus is not limited to those described here. For example, while the invention has been described here in terms of a DBMS that uses a massively parallel processing (MPP) architecture, other types of database systems, including those that use a symmetric multiprocessing (SMP) architecture, are also useful in carrying out the invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for administering the workload of a database system as it executes one or more requests, the method including:
   sorting the one or more requests into one or more workload groups, each workload group having an associated level of service desired from the database system;
   executing the one or more requests in an order intended to achieve the levels of service associated with each of the workload groups;
   assigning system resources to the one or more workload groups as necessary to provide the level of service associated with each workload group;
   monitoring on a short-term basis the execution of requests to detect a deviation from the level of service greater than an short-term threshold and if such a deviation is detected:
   adjusting the assignment of system resources to workload groups to reduce the deviation;
   monitoring on a long-term basis to detect deviations from the expected level of service greater than a long-term threshold, and if such a deviation is detected:
   adjusting the execution of requests to better provide the expected level of service.

2. The method of claim 1 where adjusting the assignment of system resources to applications includes:
   adjusting the CPU and associated IO allocation assigned to each workload group.

3. The method of claim 1 where sorting includes:
   dividing the requests into one or more workload groups; and
   assigning service level goals (SLGs) to the one or more workload groups.

4. The method of claim 3 where sorting further includes:
   mapping the one or more workload groups to the one or more classes depending on the SLGs assigned to each of the one or more workload groups.

5. The method of claim 3 where assigning SLGs includes:
   accepting input from a user; and
   providing guidance to the user.

6. The method of claim 5 where providing guidance includes:
   receiving information regarding the performance of the system; and
   providing guidance to the user based on the received information regarding a current ability of the system to satisfy the SLGs.

7. The method of claim 3 where assigning SLGs includes:
   publishing the SLGs to the system.

8. The method of claim 1 where monitoring on a short-term basis includes:
   monitoring the throughput of requests assigned to each workload group; and
   calculating a performance goal index (PGI) from throughput for each workload group.

9. The method of claim 8 where monitoring the throughput includes measuring the average response time, where calculating the PGI includes:
   dividing the average response time by the response time goal.

10. The method of claim 8 where adjusting the assignment of system resources includes:
    adjusting the assignment of the system resources to the one or more workload groups to minimize a maximum PGI.

11. The method of claim 8 where the workload groups are divided into high priority workload groups and low priority workload groups and where adjusting the assignment of system resources includes:
    adjusting the assignment of the system resources in favor of the high priority workload groups to minimize a maximum PGI for the high priority workload groups.

12. The method of claim 1 where adjusting the execution of requests includes:
    swapping out a request based on its workload group assignment to free up system resources.

13. The method of claim 1 where adjusting the execution of requests includes:
    aborting the execution of a request based on its workload group assignment.

14. The method of claim 1 where adjusting the execution of requests includes:
    delaying execution of a request based on its workload group assignment.

15. The method of claim 1 where monitoring on a long-term basis includes:
   logging the deviations greater than the long-term threshold in an error log.

16. The method of claim 15 where monitoring on a long-term basis further includes:
   making the error log available for a user to view.

17. A computer program, stored on a tangible storage medium, for use in administering the workload of a database system as it executes one or more requests, the program including executable instructions that cause a computer to:
   sort the one or more requests into one or more workload groups, each workload group having an associated level of service desired from the database system;
   execute the one or more requests in an order intended to achieve the levels of service associated with each of the workload groups;
   assign system resources to the one or more workload groups as necessary to provide the level of service associated with each workload group;
   monitor on a short-term basis the execution of requests to detect a deviation from the level of service greater than an short-term threshold and if such a deviation is detected:
      adjust the assignment of system resources to workload groups to reduce the deviation;
   monitor on a long-term basis to detect deviations from the expected level of service greater than a long-term threshold, and if such a deviation is detected:
      adjust the execution of requests to better provide the expected level of service.

18. The computer program of claim 17 where when adjusting the assignment of system resources to workload groups the executable instructions cause the computer to:
   adjust the CPU and associated IO allocation assigned to each workload group.

19. The computer program of claim 17 where when sorting the executable instructions cause the computer to:
   divide the requests into one or more workload groups; and
   assign service level goals (SLGs) to the one or more workload groups.

20. The computer program of claim 19 where when sorting the executable instructions further cause the computer to:
   map the one or more workload groups to the one or more classes depending on the SLGs assigned to each of the one or more workload groups.

21. The computer program of claim 19 where when assigning SLGs the executable instructions cause the computer to:
   accept input from a user; and
   provide guidance to the user.

22. The computer program of claim 21 where when providing guidance the executable instructions cause the computer to:
   receive information regarding the performance of the system; and
   provide guidance to the user based on the received information regarding a current ability of the system to satisfy the SLGs.

23. The computer program of claim 20 where when assigning SLGs the executable instructions cause the computer to:
   publish the SLGs to the system.

24. The computer program of claim 17 where when monitoring on a short-term basis the executable instructions cause the computer to:
   monitor the throughput of requests assigned to each workload group; and
   calculate a performance goal index (PGI) from throughput for each workload group.

25. The computer program of claim 24 where monitoring the throughput includes measuring the average response time, and where when calculating the PGI the executable instructions cause the computer to:
   divide the average response time by the response time goal.

26. The computer program of claim 24 where when adjusting the assignment of system resources the executable instructions cause the computer to:
   adjust the assignment of the system resources to the one or more workload groups to minimize a maximum PGI.

27. The computer program of claim 24 where the workload groups are divided into high priority workload groups and low priority workload groups and where when adjusting the assignment of system resources the executable instructions cause the computer to:
   adjust the assignment of the system resources in favor of the high priority workload groups to minimize a maximum PGI for the high priority workload groups.

28. The computer program of claim 17 where when adjusting the execution of requests the executable instructions cause the computer to:
   swap out a request based on its workload group assignment to free up system resources.

29. The computer program of claim 17 where when adjusting the execution of requests the executable instructions cause the computer to:
   abort the execution of a request based on its workload group assignment.

30. The computer program of claim 17 where when adjusting the execution of requests the executable instructions cause the computer to:
   delay execution of a request based on its workload group assignment.

31. The computer program of claim 17 where when monitoring on a long-term basis the executable instructions cause the computer to:
   log the deviations greater than the long-term threshold in an error log.

32. The computer program of claim 31 where when monitoring on a long-term basis the executable instructions further cause the computer to:
   make the error log available for a user to view.

33. A database system including:
   a massively parallel processing system including:
   one or more nodes;
   a plurality of CPUs, each of the one or more nodes providing access to one or more CPUs;
   a plurality of data storage facilities each of the one or more CPUs providing access to one or more data storage facilities;
   a process for execution on the massively parallel processing system for administering the workload of a database system as it executes one or more requests, the process including:
      sorting the one or more requests into one or more workload groups, each workload group having an associated level of service desired from the database system;
      executing the one or more requests in an order intended to achieve the levels of service associated with each of the workload groups;
      assigning system resources to the one or more workload groups as necessary to provide the level of service associated with each workload group;

monitoring on a short-term basis the execution of requests to detect a deviation from the level of service greater than an short-term threshold and if such a deviation is detected:
  adjusting the assignment of system resources to workload groups to reduce the deviation;
monitoring on a long-term basis to detect deviations from the expected level of service greater than a long-term threshold, and if such a deviation is detected:
  adjusting the execution of requests to better provide the expected level of service.

34. The database system of claim 33 where adjusting the assignment of system resources to workload groups includes:
  adjusting the CPU and associated IO allocation assigned to each workload group.

35. The database system of claim 33 where sorting includes:
  dividing the requests into one or more workload groups; and
  assigning service level goals (SLGs) to the one or more workload groups.

36. The database system of claim 35 where sorting further includes:
  mapping the one or more workload groups to the one or more classes depending on the SLGs assigned to each of the one or more workload groups.

37. The database system of claim 35 where assigning SLGs includes:
  accepting input from a user; and
  providing guidance to the user.

38. The database system of claim 37 where providing guidance includes:
  receiving information regarding the performance of the system; and
  providing guidance to the user based on the received information regarding a current ability of the system to satisfy the SLGs.

39. The database system of claim 35 where assigning SLGs includes:
  publishing the SLGs to the system.

40. The database system of claim 33 where monitoring on a short-term basis includes:
  monitoring the throughput of requests assigned to each workload group; and
  calculating a performance goal index (PGI) from throughput for each workload group.

41. The database system of claim 40 where monitoring the throughput includes measuring the average response time, and where calculating the PGI includes:
  dividing the average response time by the response time goal.

42. The database system of claim 40 where adjusting the assignment of system resources includes:
  adjusting the assignment of the system resources to the one or more workload groups to minimize a maximum PGI.

43. The database system of claim 40 where the workload groups are divided into high priority workload groups and low priority workload groups and where adjusting the assignment of system resources includes:
  adjusting the assignment of the system resources in favor of the high priority workload groups to minimize a maximum PGI for the high priority workload groups.

44. The database system of claim 33 where adjusting the execution of requests includes:
  swapping out a request based on its workload group assignment to free up system resources.

45. The database system of claim 33 where adjusting the execution of requests includes:
  aborting the execution of a request based on its workload group assignment.

46. The database system of claim 33 where adjusting the execution of requests includes:
  delaying execution of a request based on its workload group assignment.

47. The database system of claim 33 where monitoring on a long-term basis includes:
  logging the deviations greater than the long-term threshold in an error log.

48. The database system of claim 47 where monitoring on a long-term basis further includes:
  making the error log available for a user to view.

* * * * *